United States Patent [19]
Ohsaki

[11] Patent Number: 5,344,521
[45] Date of Patent: Sep. 6, 1994

[54] COATING FILM SEPARATING DEVICE AND COATING FILM SEPARATION METHOD USING THE DEVICE

[75] Inventor: Satoshi Ohsaki, Ushiku, Japan

[73] Assignee: Canon Kabushiki Kaisha, Tokyo, Japan

[21] Appl. No.: 863,753

[22] Filed: Apr. 6, 1992

[30] Foreign Application Priority Data

Apr. 10, 1991 [JP] Japan .................................. 3-103520
May 10, 1991 [JP] Japan .................................. 3-133182

[51] Int. Cl.⁵ .......................... B32B 31/16; B32B 31/18
[52] U.S. Cl. ...................... 156/584; 156/344;
156/277; 414/758; 414/783; 414/788.5;
271/280; 271/900
[58] Field of Search ................ 156/584, 344, 247;
271/97, 280–285, 900; 414/788.5, 771, 758, 783

[56] References Cited

U.S. PATENT DOCUMENTS

| | | | |
|---|---|---|---|
| 3,617,054 | 11/1971 | Schilling | 271/69 X |
| 4,141,456 | 2/1979 | Hart | 314/1 R X |
| 4,555,844 | 12/1985 | Palfery | 414/758 X |
| 4,685,991 | 8/1987 | Hermann | 156/584 X |
| 4,724,032 | 2/1988 | Kay | 156/184 X |
| 4,770,600 | 9/1988 | Ishikawa | 414/783 |
| 4,778,332 | 10/1988 | Byers | 414/735 X |
| 4,843,712 | 7/1989 | Hellstern | 414/783 X |
| 4,855,012 | 8/1989 | Sumi | 156/584 X |
| 4,867,837 | 9/1989 | Seki | 156/584 X |
| 4,880,488 | 11/1989 | Matsuo | 156/344 X |
| 5,000,814 | 3/1991 | Sumi | 156/344 X |

FOREIGN PATENT DOCUMENTS

| | | | |
|---|---|---|---|
| 0118434 | 6/1985 | Japan | 414/758 |
| 0228345 | 11/1985 | Japan | 414/758 |
| 0273418 | 12/1986 | Japan | 414/783 |
| 0051555 | 3/1987 | Japan | 156/584 |
| 0250057 | 10/1990 | Japan | 156/584 |
| 1572716 | 7/1980 | United Kingdom | 156/584 |

Primary Examiner—David A. Simmons
Assistant Examiner—C. Rainwater
Attorney, Agent, or Firm—Fitzpatrick, Cella, Harper & Scinto

[57] ABSTRACT

A coating film separating device includes a substrate holding device for holding a substrate, at least one side of which is covered with a coating film, a roller unit equipped with a roller and a device for pressing the roller against an end portion of the surface of the coating film, a roller unit driving device for moving the roller unit on the end portion of the surface of the coating film in the widthwise direction of the substrate, a guide device for enabling the roller unit to move along an end portion of the substrate, and a device for spraying pressurized fluid at the interface between the substrate and the coating film at the edge portion of the substrate along which the roller unit moves.

29 Claims, 15 Drawing Sheets

COATING FILM SEPARATING DEVICE AND COATING FILM SEPARATION METHOD USING THE DEVICE

BACKGROUND OF THE INVENTION

1. Field of the Invention

The present invention relates to a device for separating a coating film from the surface of a substrate held in close contact therewith and to a method of separating such a coating film by using the device.

2. Description of the Related Art

The surface of a resin substrate of acrylic resin, polycarbonate or the like and that of a glass substrate are subject to flaws and adhesion of dust. In view of this, coating films are loosely adhered to these surfaces by means of an adhesive or the like. In particular, in the case of a substrate for an optical recording medium, such as an optical card or an optical disc, any flaws on the surface of the substrate and adhesion of dust thereto will lead to defects in the optical recording medium to be obtained therefrom. Accordingly, where the fabrication of such substrates and the process of making optical recording mediums from then are not conducted continuously, the above-mentioned adhesion of coating films to the substrate surfaces is an effective means for improving the yield of the optical recording mediums.

However, in the above method of separating coating films, a double-coated adhesive tape is employed to separate the coating films from the substrate surfaces. Thus, as the operation of separating coating films is continued, the adhesive strength of the double-coated adhesive tape gradually degenerates, with the result that it becomes difficult to raise the coating film from the substrate surface in a stable manner. To raise the coating films in a stable manner, it is necessary to periodically replace the double-coated adhesive tape with a new one, resulting in the need to use a large number of such adhesive tapes.

Further, as the conventional separating operation described above is performed manually, the efficiency of such an operation is rather poor. Moreover, with this conventional method, the substrate from which the coating film has been removed is subject to flaws and adhesion of dust.

Another problem with the manual separation is that the speed at which the coating film is separated differs from substrate to substrate. Such a difference in the separation speed may cause the substrates to be electrically charged, with the charging amount varying greatly from substrate to substrate. Further, some of the adhesive of the coating film may remain at various portions on the substrate surface. Thus, with the conventional, manual separation method, it is difficult to keep the condition of the surfaces of the substrates uniform after the separation of the coating films therefrom.

SUMMARY OF THE INVENTION

The present invention has been made in view of the above problems of the prior-art technique. It is an object of the present invention to provide a coating film separating device which can separate coating films easily and in a stable manner without using any double-coated adhesive tape, as well as a coating film separation method using the device.

Another object of the present invention is to provide a coating film separating device which can separate coating films easily, continuously and reliably and keep the condition of the substrate surfaces uniform after the separation of the coating films therefrom, as well as a coating film separation method using the device.

In accordance with one aspect of the invention, a coating film separating device comprises substrate holding means for holding a substrate having first and second surfaces, with at least one surface being covered with a coating film, a roller unit equipped with a roller and means for pressing the roller against an edge portion of a surface of the coating film, and roller unit driving means for moving the roller unit on the edge portion of the surface of the coating film in a widthwise direction of the substrate. Guide means guides the roller unit to move along an edge portion of the substrate, and means spray pressurized fluid at an interface between the substrate and the coating film at the edge portion of the substrate along which the roller moves.

In accordance with another aspect of the invention, the coating film separating device described above further includes coating film removing means for removing the coating film from the substrate, with the removing meas including coating film gripping means for gripping an end portion of the coating film separated from the substrate and means for moving the coating film gripping means in a direction perpendicular to the widthwise direction of the substrate.

In accordance with another aspect of the invention, a method of separating from a substrate a coating film which covers at least one side of the substrate comprises the steps of supporting a substrate on a surface of a substrate fixing stand, with the substrate having at least one side covered with a coating film, moving a roller over the coating film in a widthwise direction of the substrate along an edge portion thereof and pressing the roller against the coating film, and spraying pressurized fluid at an interface between the substrate and the coating film at the edge portion of the substrate along which the roller has been moved so as to separate the coating film from the substrate.

In accordance with another aspect of the invention, the method of separating from a substrate a coating film which covers at least one side of the substrate as described above can also include the step of gripping the end portion of the coating film separated from the substrate with a film gripper, and moving the film gripper perpendicular to the widthwise direction of the substrate to remove the coating film therefrom.

Figure 7:
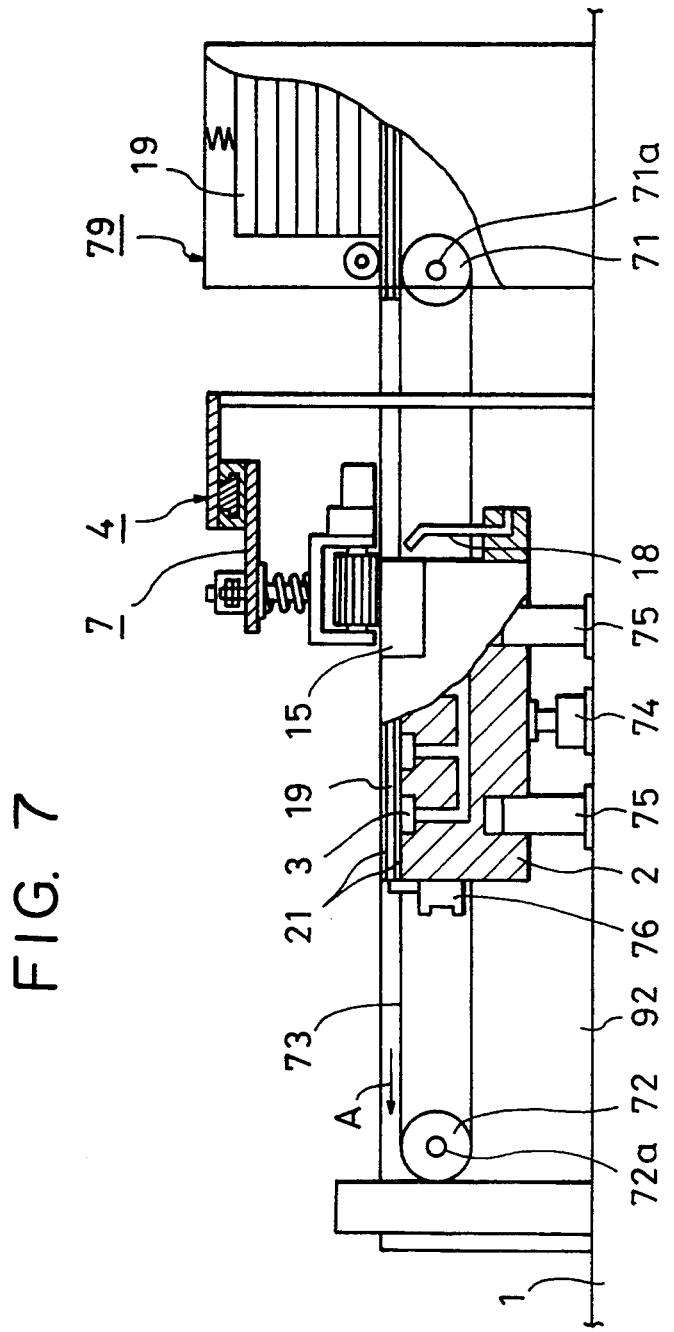
Figure 8:
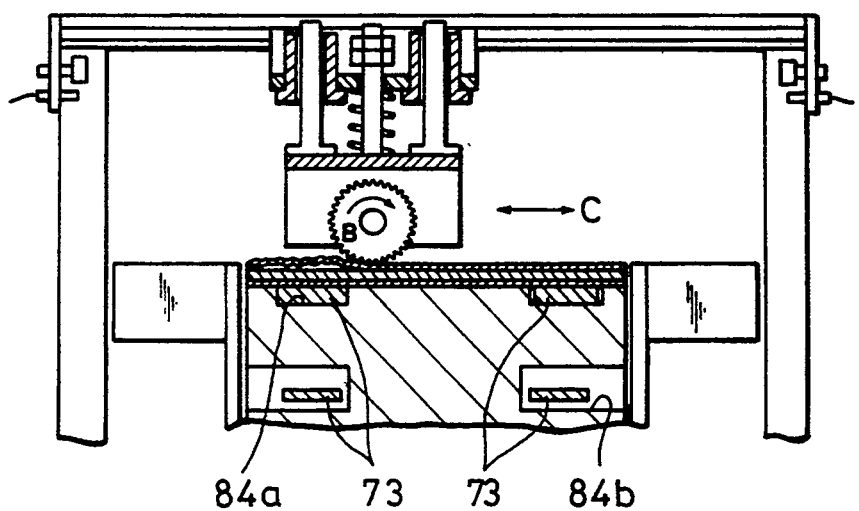
Figure 9:
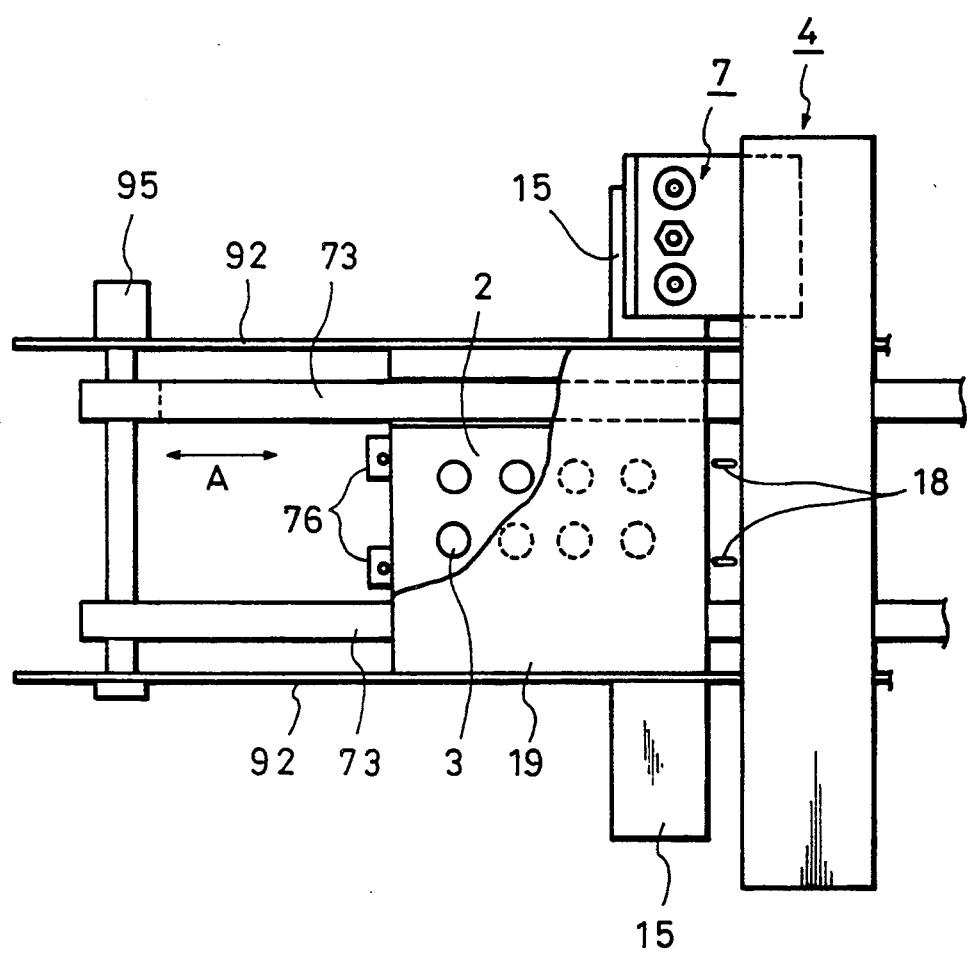
Figure 10:
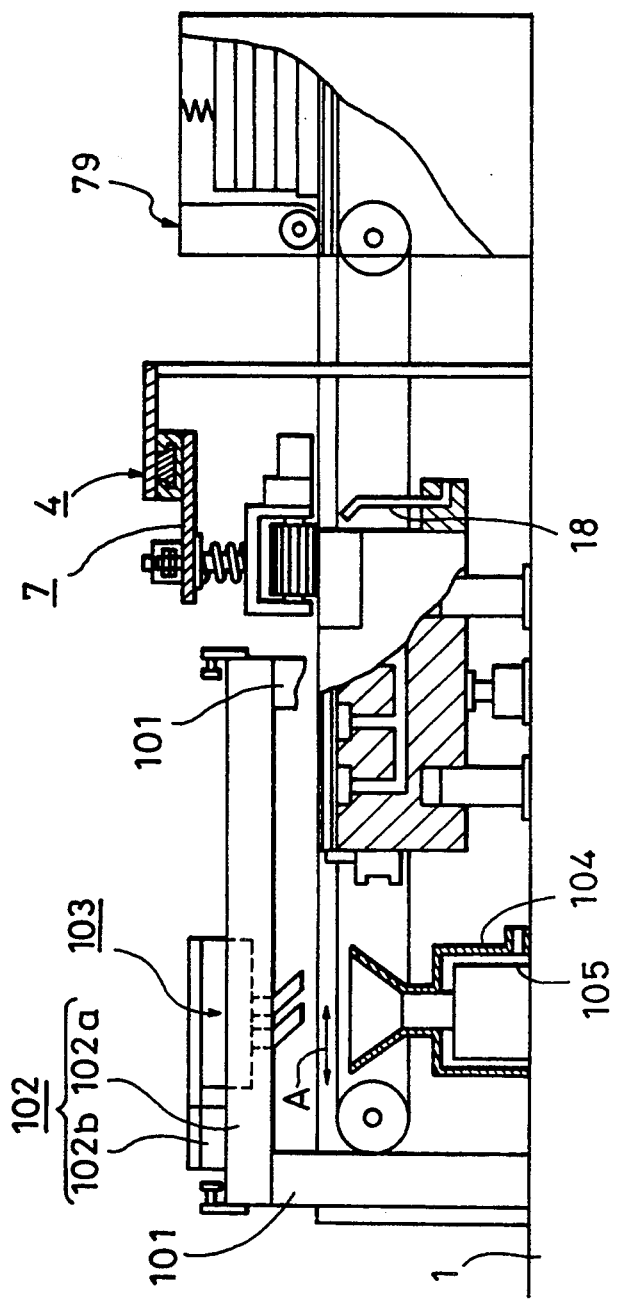
Figure 11:
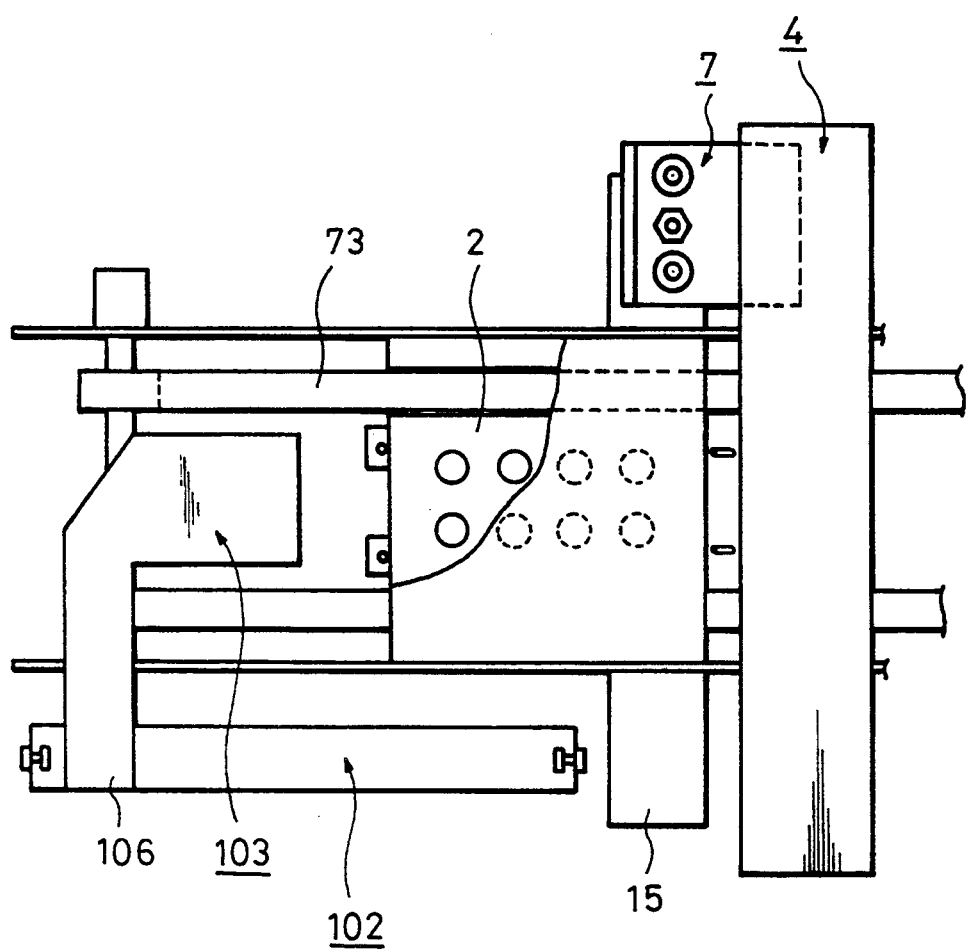
Figure 12:
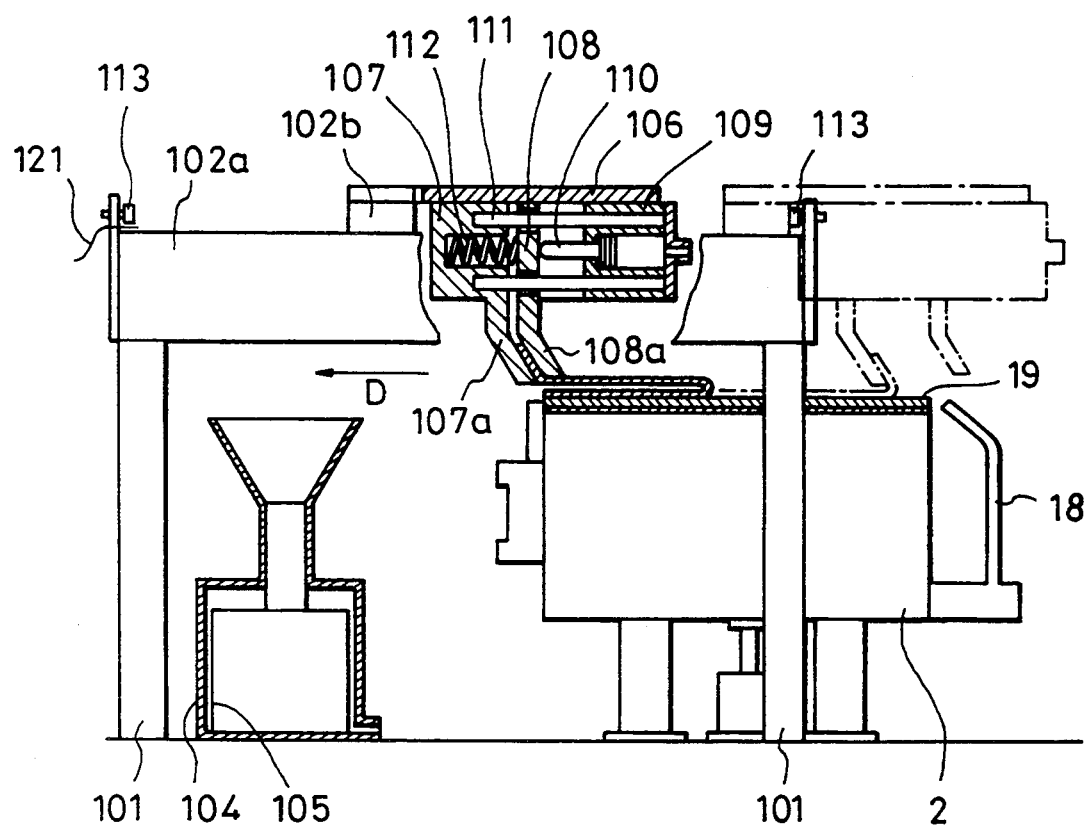
Figure 13:
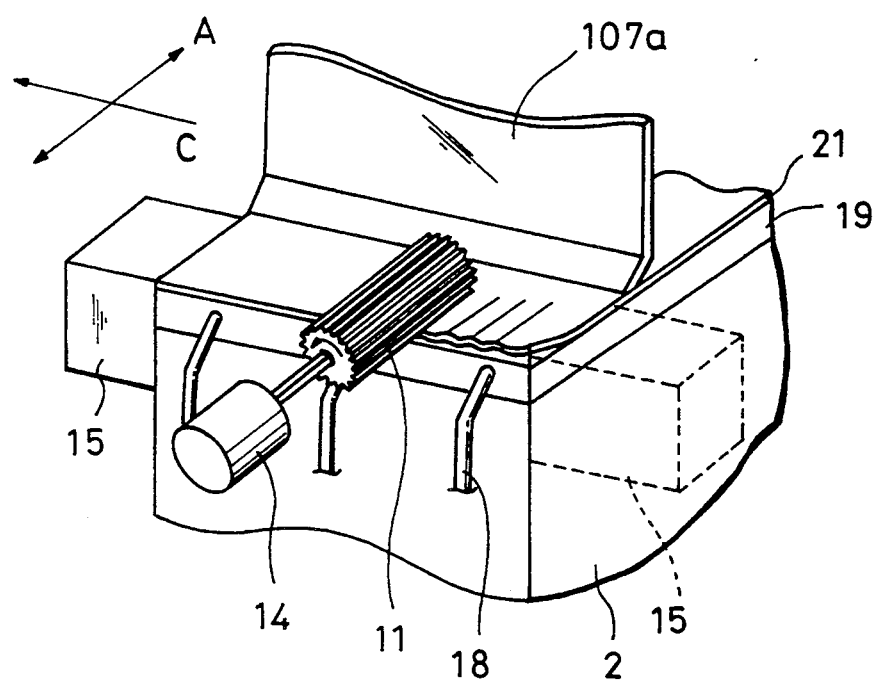
Figure 14:
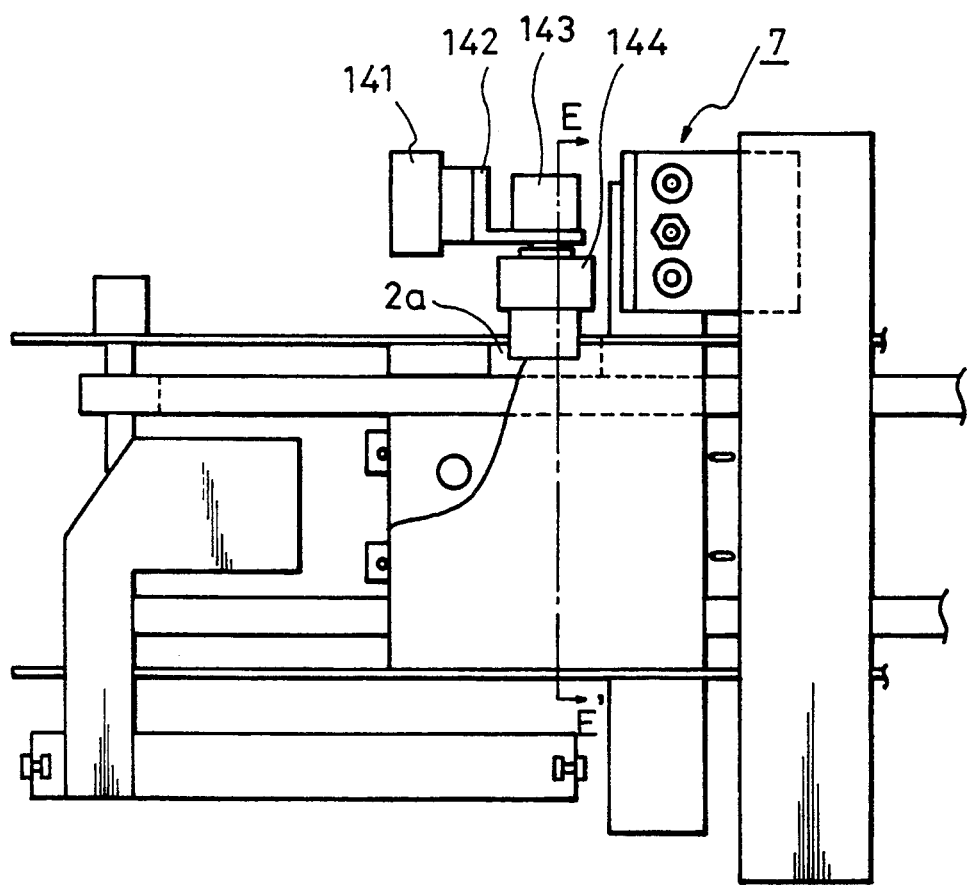
Figure 15:
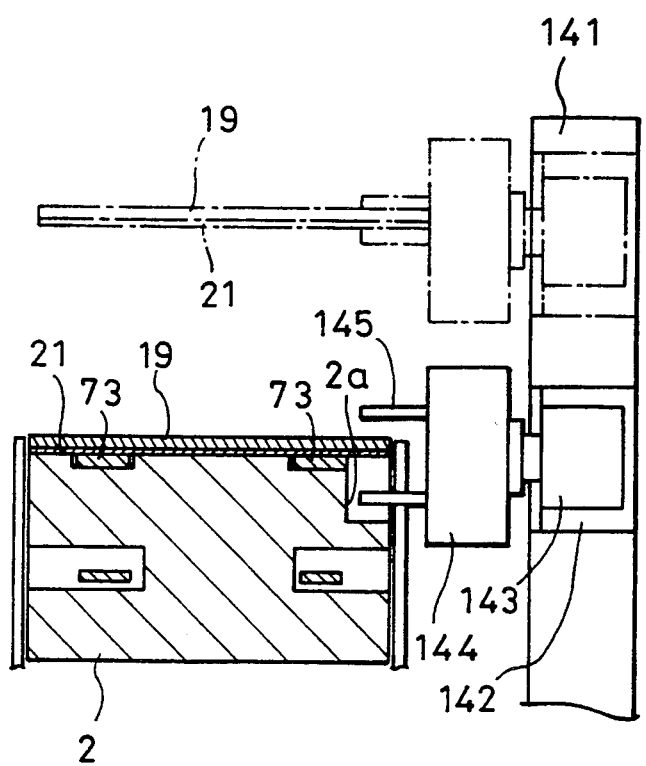

FOGS. 6(a) and 6(b) are diagrams illustrating roller arrangements with respect to the substrate;

FIG. 7 is a schematic sectional view of a coating film separating device according to still another embodiment of the present invention;

FIG. 8 is a schematic side view of the coating film separating device of FIG. 7;

FIG. 9 is a schematic plan view of the coating film separating device of FIG. 7;

FIG. 10 is a schematic sectional view of a coating film separating device according to a further embodiment of the present invention;

FIG. 11 is a schematic plan view of the coating film separating device of FIG. 10;

FIG. 12 is a diagram illustrating a coating film removing method using the coating film separating device of FIG. 10;

FIG. 13 is a diagram illustrating a coating film separating method using the coating film separating device of FIG. 10;

FIG. 14 is a schematic plan view of a coating film separating device according to a still further embodiment of the present invention; and FIG. 15 is a schematic sectional view taken along the line E-E' of FIG. 14.

DESCRIPTION OF THE PREFERRED EMBODIMENTS

The present invention will now be described in detail with reference to the drawings.

Figure 1:
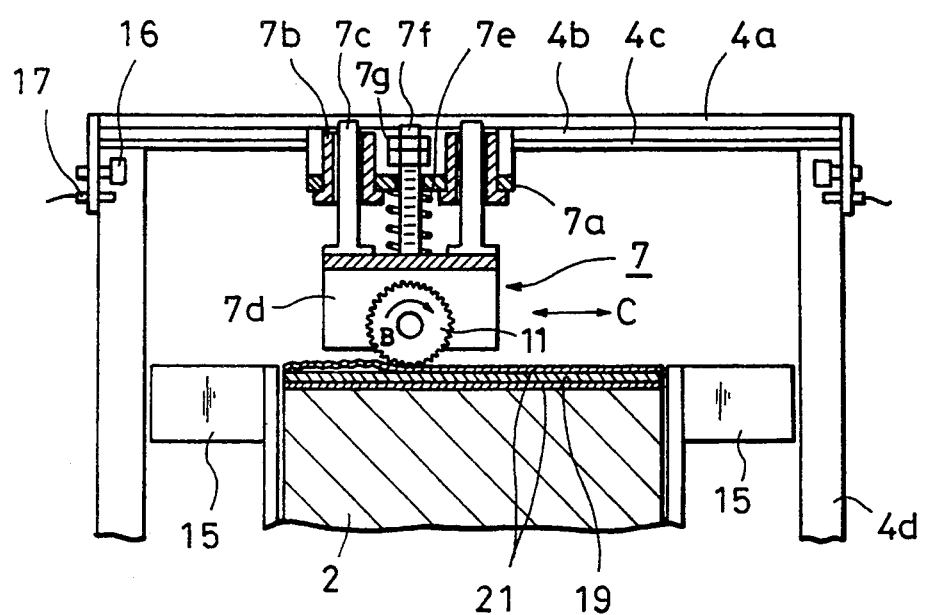
FIG. 1 is a schematic side sectional view of a coating film separating device according to an embodiment of the present invention.
Figure 2:
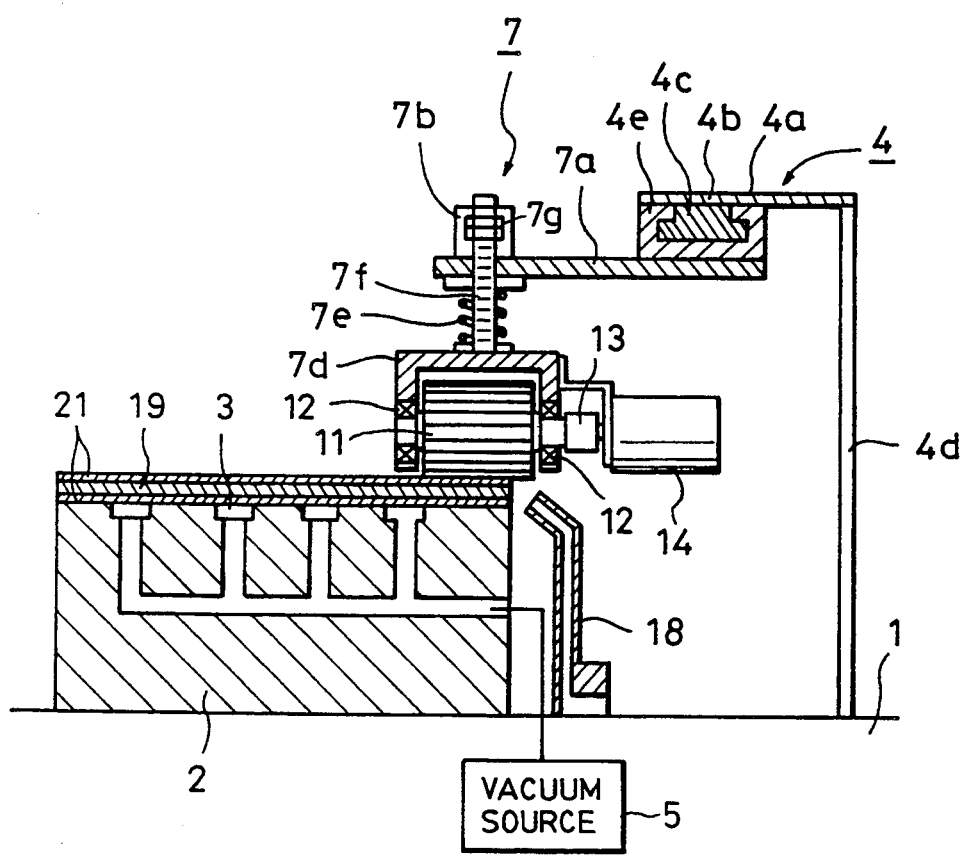
FIG. 2 is a schematic front sectional view of the coating film separating device of FIG. 1.

FIGS. 1 and 2 are partially cutaway schematic side and front views of a coating film separating device according to an embodiment of the present invention. In the drawings, placed on a base 1 is a substrate fixing stand 2 for holding on its upper surface a substrate 19 whose obverse and reverse sides are covered with a coating film 21 adhered thereto. Formed on the upper surface of the substrate fixing stand 2 are a plurality of suction ports 3 for vacuum-attracting the substrate 19, the suction ports 3 being connected to a sucking device 5 via an air passage branching off to each of them. The element shown in block outline in FIG. 2 is well known per se, and a specific type of construction is not critical to carrying out the invention or to a disclosure of the best mode for carrying out the invention.

As shown in FIG. 1, the substrate fixing stand 2 has roller blocks 15 which are integrally formed on the substrate fixing stand at the rear end thereof, i.e., on either side of its right-hand end portion as seen in FIG. 2. The roller blocks 15 serve as supports for a roller 11 of a roller unit 7 described below. The roller blocks 15 are so arranged that their upper surfaces are flush with the upper surface of the coating film 21 on the surface of the substrate 19 held on the substrate fixing stand 2.

Next, the roller unit 7 and guide means 4 for guiding the roller unit will be described. The roller unit 7 is equipped with means for pressing the roller 11 directly against the surface of the coating film 21. The guide means 4 for the roller unit 7 enables the roller unit 7 to move along an end portion of the substrate in a widthwise direction (indicated by arrow C of FIG. 1) of the same. The roller unit 7 and the guide means 4 will be described in more detail with reference to the drawings.

In FIG. 2, a guide plate 4a serving as the guide means 4 is arranged on the right-hand side of the substrate fixing stand 2. The plate 4a is composed of two legs 4d provided on either side thereof, a horizontal section 4b connecting the legs 4d and having a surface parallel to the base 1, and a guide section 4c integrally provided on the lower surface of the horizontal section 4b and extending in the longitudinal direction of the horizontal section 4b (i.e., in the direction perpendicular to the plane of FIG. 2). The guide section 4c exhibits a sectional configuration having an upward protrusion. Slidably engaged with the guide section 4c is a slider section 4e, on the lower surface of which is integrally arranged one end portion of a roller support plate 7a of the roller unit 7. The other end portion of the roller support plate 7a extends above the rear end portion of the substrate fixing stand 2. Integrally provided on the other end portion of the roller support plate 7a are two pressing guides 7b formed as hollow cylinders extending through the roller support plate 7a.

Slidably fitted into the interior of the hollow pressing guides 7b are guide pins 7c, at the lower end of which is integrally provided a rectangular roller cover 7d which is open at it lower end. Provided between the roller support plate 7a and the roller cover 7d is a compression coil spring 7e extending parallel to the guide pins 7c. Inserted into the compression coil spring 7e is a spring guide 7f integrally provided on the roller cover 7d and extending upwards through the roller support plate 7a in such a manner as to be slidable with respect to the support plate 7a. The outer peripheral surface of the spring guide 7f has a threaded groove, and screwed onto the upper end section of the spring guide 7f is a nut 7g for preventing the roller cover 7d from dropping.

As shown in FIG. 2, a roller 11 is rotatably supported inside the roller cover 7d through the intermediation of a pair of bearings 12. The roller 11 is arranged such that its axis extends perpendicularly to the longitudinal direction of the guide plate 4a. The rotating shaft of the roller 11 is connected through a coupling 13 to the output shaft of a roller driving motor 14 attached to the roller cover 7d, and the roller 11 is rotated by the roller driving motor 14. In this embodiment, the motor 14 constitutes the driving means for the roller unit 7.

Except when it is operating, the roller 11 is positioned on the upper surface of either of the roller blocks 15. By rotating the roller 11 by the roller driving motor 14, the roller 11 is moved from one roller block 15 to the other by way of the upper surface of the coating film 21 adhered to the surface of the substrate 19, by virtue of the friction between the roller 11 and the surface against which it is pressed.

Provided at either end of the guide plate 4a are roller stoppers 16 for stopping the movement of the roller 1 and roller detection sensors 17 for detecting the roller 11 when it is at an end of the guide plate 4a.

Further, as shown in FIG. 2, provided in the rear section of the substrate fixing stand 2 are nozzles 18 for spouting, or spraying, pressurized fluid at the interface between the substrate and the coating film at the end portion of the substrate along which the roller moves. Provided at the lower end of the nozzles 18 is a pressurized fluid supply means (not shown) for supplying a fluid such as air or an inert gas. The number of such nozzles may be one, or a plurality of such nozzles may be arranged in the widthwise direction of the substrate.

Next, a method of separating coating films using the above-described coating film separating device will be explained with reference to FIGS. 1 and 2.

First, the substrate 19, both sides of which are covered with the coating film 21, is placed on the upper surface of the substrate fixing stand 2, to which it is vacuum-attached by means of a suction device (not shown).

Then, the roller 11 is rotated about its own axis in the direction of arrow B by the roller driving motor 14. The rotation of the roller 11 due to its torque causes the roller 11 to move from one roller block 15 to the other, in the direction indicated by arrow C, along an end portion of the substrate 19 while pressing the roller blocks and the substrate 19 downwardly. When the roller 11 reaches the other roller block 15 and the slider section 4e abuts the roller stopper 16, the roller detection sensor 17 detects that the roller 11 is at an end of its movement, and causes the roller driving motor 14 to stop its rotation.

Figure 3:
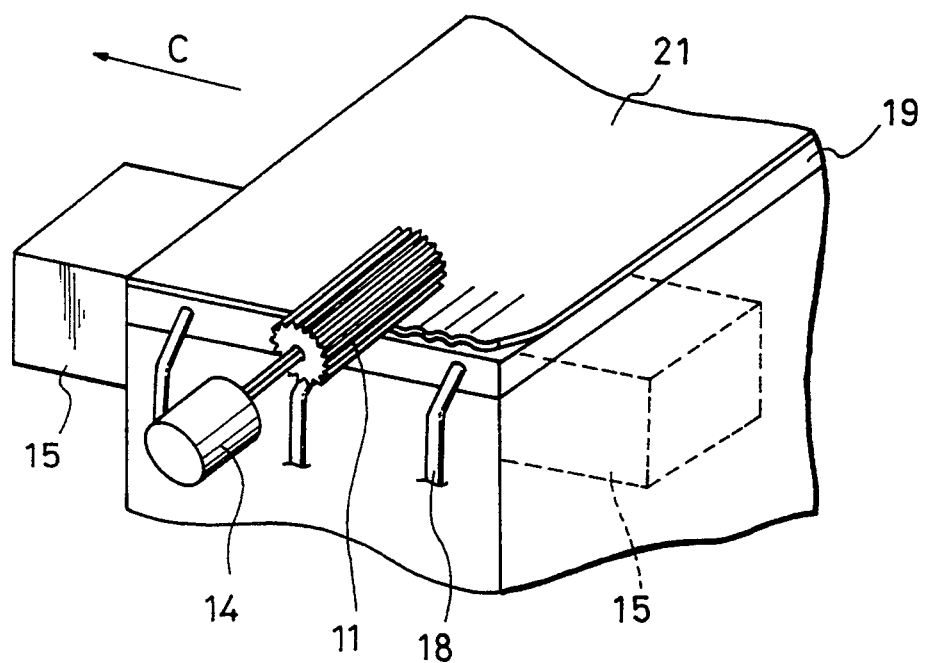
FIG. 3 is a diagram illustrating a coating film separation method using the coating film separating device of the present invention.

As shown in FIG. 3, by rotating the roller 11 while pressing it against the surface of the substrate 19, the roller 11 gnaws into the coating film 21 on the surface of the substrate 19. While the force from the torque of the roller 11 is applied to the coating film 21 in a direction opposite to arrow C, a reaction against this force is generated due to the frictional resistance between the roller 11 and the coating film 21 and causes the roller 11 to move in the direction of arrow C. When the force opposite arrow C is applied to the coating film 21, slippage is generated between the coating film 21 and the substrate 19, causing the coating film 21 to be wrinkled and stretched as the roller 11 moves along, with the result that a gap is generated between the coating film 21 and the substrate 19. When pressurized fluid is blown from the nozzles 18 against the gap between the substrate 19 and the coating film 21, which has been wrinkled as stated above, the coating film 21 is raised from an end portion of the substrate 19 by the force of the pressurized fluid, thereby facilitating the gripping of the coating film 21 and, consequently, the separation of the coating film 21 from the substrate 19. The pressure of the pressurized fluid blown from the nozzles 18 preferably ranges from 2 to 10 kgf/cm$^2$ and, more preferably, from 4 to 7 kgf/cm$^2$.

When the coating film 21 has been separated from the substrate 19, the vacuum-attraction of the substrate 19 to the substrate fixing stand 2 by the above-mentioned suction device ceases, and the substrate 19 is removed from the substrate fixing stand 2, thereby terminating the operation of separating the coating film 21.

Figure 4:
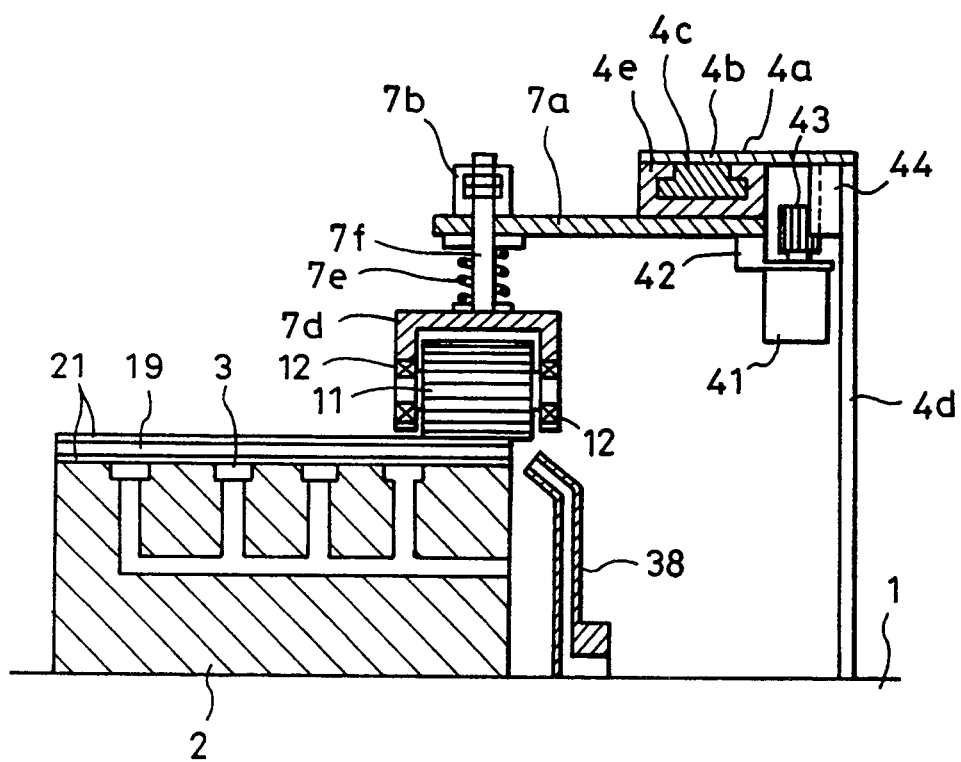
FIG. 4 is a schematic sectional view of a coating film separating device according to another embodiment of the present invention.
Figure 5:
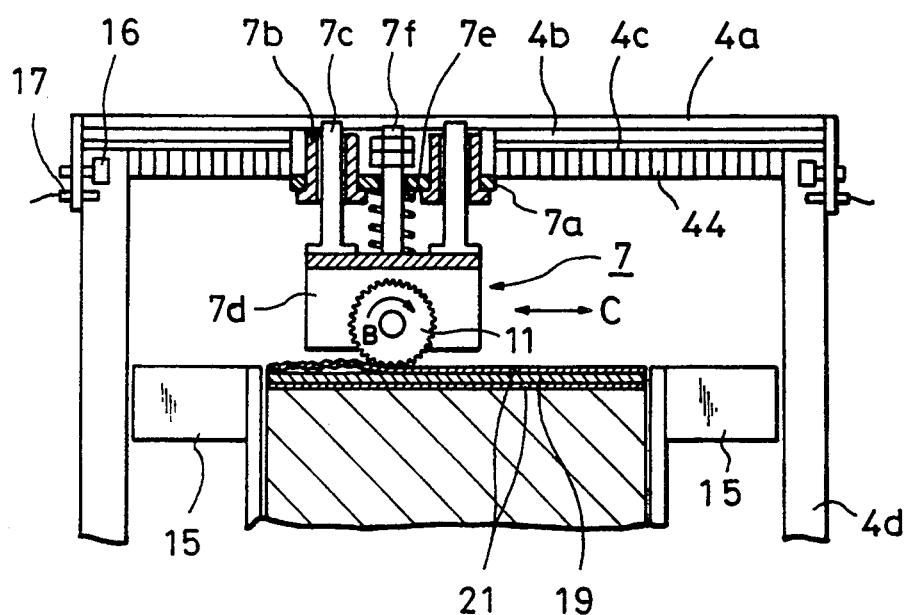
FIG. 5 is a schematic side view of the coating film separating device of FIG. 4.

In the above-described coating film separating device of the present invention, it is possible to adopt, instead of the roller driving motor 14, the construction shown in FIGS. 4 and 5 as the means for driving the roller unit 7. In this construction, a travelling motor 41 is attached to the roller support plate 7a through the intermediation of a bracket 42. Attached to the drive shaft of the travelling motor 41 is a pinion gear 43, which is engaged with a rack 44 attached to the guide plate 4a. The rack 44 is arranged parallel to the guide section 4c, and, by rotating the travelling motor 41, the roller support plate 7a travels along the guide section 4c. As a result, the roller 11 becomes capable of moving along an end portion of the substrate while rotating in the direction indicated by arrow B.

The type of roller 11 used in the coating film separating device of the present invention described above is not particularly limited. It can be arbitrarily selected from various types of rollers as long as it is capable of gnawing into the coating film 21 when pressed against the surface of the coating film 21 and separating the coating film 21 from the substrate by moving on the surface of the coating film. For example, a roll having needle-like projections on its surface or a toothed roll having teeth formed parallel to its axis is preferable since it can be made to positively gnaw into the coating film. In the case of a toothed roller, the depth of the teeth varies depending upon the thickness of the coating film 21. When, for example, the thickness of the coating film is approximately from 10 to 100 $\mu$m, the depth of the teeth preferably ranges from 0.3 to 3 mm and, more preferably, from 0.8 to 1.5 mm. The pitch of the teeth preferably ranges from 0.2 to 2 mm and, more preferably, from 0.5 to 1 mm.

The diameter of the roller used preferably ranges from 10 to 30 mm $\emptyset$ and, more preferably, from 15 to 25 mm $\emptyset$. Taking wear or the like of the teeth into consideration, the material of the roller may be carbon steel (for example, S45C, SCM440 or SK4), stainless steel or the like.

Further, the force with which the roller 11 is pressed against the surface of the coating film is preferably selected within a range allowing the rotation of the roller 11 to cause the coating film 21 to be separated from the substrate 19 without causing any breakage of the coating film or generation of flaws on the surface of the substrate 19. The preferable pressing force varies depending upon the thickness of the coating film, the material of the roller and the configuration of the peripheral surface thereof. For example, when removing a coating film having a thickness of 10 to 100 $\mu$m by a toothed roller of stainless steel (depth of teeth: 1.5 mm; pitch: 1.0 mm), the pressing force preferably ranges from 0.15 to 0.5 kgf/mm and, more preferably, from 0.25 to 0.3 kgf/mm.

The rotational speed of the roller 11 on the surface of the coating film caused by the roller unit driving means preferably ranges from 50 to 70 r.p.m. and, more preferably, from 55 to 65 r.p.m. Further, the amount by which the roller 11 and the substrate 19 overlap each other (the length F in FIG. 6(a)) varies depending upon the configuration of the roller and the pressing force applied. A preferable range for the length is from 5 to 15 mm and, in particular, 7 to 12 mm since it will help to positively separate the coating film from the substrate.

Figure 6A:
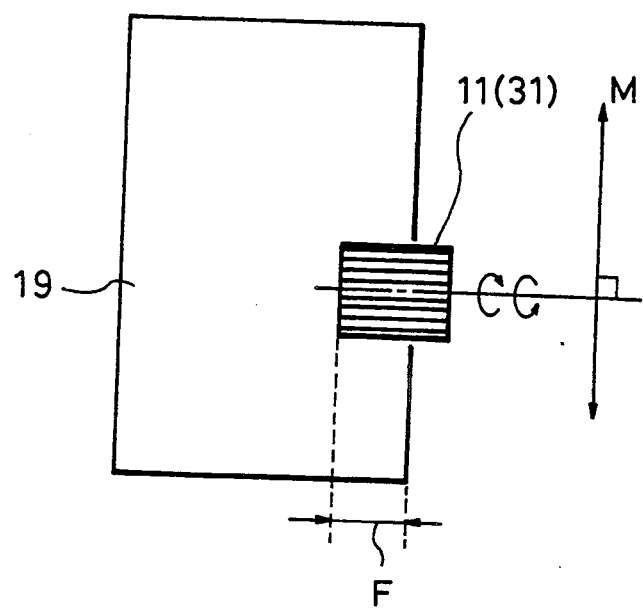
Figure 6B:
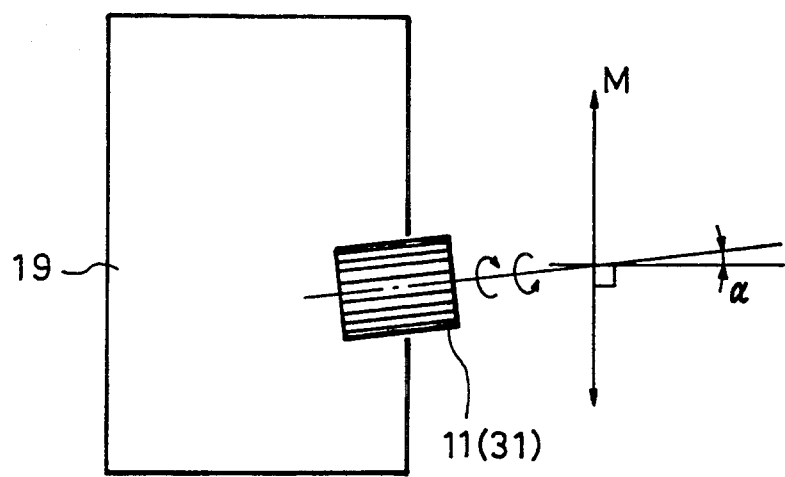

Further, while in the above-described embodiment of the coating film separating device of the present invention, the axis of the roller extends perpendicularly to the longitudinal direction of the guide plate 4a (the direction of arrow M) (see FIG. 6(a)). It is also possible, as shown in FIG. 6(b), to incline the roller 11 by a fixed angle $\alpha$ within a plane parallel to the substrate. This arrangement is more advantageous in that the difference between the rotating direction of the roller and the direction of movement controlled by the guide plate 4a acts as a friction component to generate slippage between the substrate and the coating film, with the result that a gap can be generated more easily between them. The angle $\alpha$ preferably ranges from 10° to 40° and, more preferably, from 15° to 30°.

Next, an embodiment of the present invention which can be suitably employed for continuously separating the coating films 21 will be described with reference to FIGS. 7 and 8.

In FIG. 7, two upright side plates 92 are arranged parallel to each other on the base 1. Arranged between these side plates is a substrate fixing stand 2 serving as the substrate holding means and supported by the upper end of a rod of a cylinder 74 secured to the base 1. Provided in the base portion of the substrate fixing stand 2 are two guide holes, into which are fitted guide bars 75 extending upwardly from the base 1.

The cylinder 74 and the guide bars 75 function as a means for raising and lowering the substrate fixing stand 2 parallel to the base 1.

Further, rotatably supported at the left-hand end (as seen in the drawing) of the side plates 92 is a driving 72a extending through the side plates so as to be perpendicular thereto, and two driving rollers 72 are secured to the section of the driving shaft 72a between the side plates. The two driving rollers 72 are spaced apart from each other in the vicinity of each side plate 92. Like the driving shaft 72a and the driving rollers 72, a driven shaft 71a and two driven rollers 71 are provided at the right-hand end (as seen in the drawing) of the side plates, with the driven rollers 71 being rotatably supported through the intermediation of the driven shaft 71a, which is parallel to the driving shaft 72a. Stretched between the driving rollers 72 and the driven rollers 71 are conveying belts 73 for conveying the substrate 19. A driving motor connected to the driving shaft 72a causes the conveying belts 73 to run simultaneously so that the substrate 19 can be conveyed perpendicularly to its width, i.e., in the direction indicated by arrow A in the drawings. Thus, these conveying belts function as substrate conveying means.

To prevent the conveying belts 73 from interfering with the substrate fixing stand 2, indented sections 84a and recesses 84b are formed in either side section of the substrate fixing stand 2, as shown in FIG. 8. The indented sections 84a are formed on the upper surface of the substrate fixing stand 2 at positions near either side surface of the same as indentations corresponding to the thickness of the conveying belts 73. When the substrate fixing stand 2 is raised to the upper end of its range of movement, the bottoms of the indented sections 84a come into contact with the reverse sides of the substrate conveying surfaces of the conveying belts 73, with the upper surface of the substrate fixing stand 2 being flush with the substrate conveying surfaces of the conveying belts 73. Accordingly, when the substrate fixing stand 2 has reached the upper end of its range of movement, the substrate 19 is supported by the substrate fixing stand 2 and the conveying belts 73. In this way, the substrate can be held on the substrate fixing stand.

Further, provided on the surface of the substrate fixing stand 20 on the downstream side with respect to the direction in which the substrate is conveyed, are two stopper cylinders 76, which are spaced apart from each other. Rods of the stopper cylinders 76 protrude upwardly, thereby serving as stoppers for the substrate 19. When in the protruded positions, the tips of the rods are above the substrate conveying surface of the conveying belts 73. Further, an optical sensor (not shown) may be embedded in the front upper surface of the substrate fixing stand 2 so that the leading edge of the substrate 19 being conveyed by the conveying belts 73 can be detected when it reaches the front end of the substrate fixing stand 2.

The operation of the coating film separating device of the present invention which is equipped with the substrate conveying means described above will now be explained.

First, the rods of the stopper cylinders 76 shown in FIGS. 7 or 9 are caused to protrude upwardly beyond the upper surfaces of the conveying belts 73, and the substrate fixing stand 2 is lowered by the raising/lowering means 74 and 75, thereby separating the upper surfaces of the indented sections 84a from the reverse sides of the substrate conveying surfaces of the conveying belts 73. In this condition, the conveying belts 73 are driven by the motor 95 to convey the substrate 19 covered with the coating film 21, which has been stored in a storage bin 79, in the direction indicated by arrow A in FIG. 7, i.e., to the left as seen in the drawing.

When the leading edge of the substrate 19 has reached the front end of the substrate fixing stand 2, the substrate 19 abuts the rods of the stopper cylinders 76, and the conveyance of the substrate 19 is stopped. At the same time, the substrate 19 is detected by the optical sensor (not shown), and the rotation of the driving motor 95 is stopped. Then, the substrate fixing stand 2 is raised to the upper end of its range of movement by the cylinder 74, and, when the upper surface of the substrate fixing stand 2 has come into contact with the reverse side of the substrate 19, the first suction device (not shown) causes the substrate 19 to be vacuum-attached to the upper surface of the substrate fixing stand 2 through the suction ports 3. When the substrate 19 has been secured in position on the substrate fixing stand 2 by vacuum suction, the rods of the stopper cylinders 76 are lowered.

Afterwards, the roller unit 7 is caused to move, as described above, while pressing against an end portion of the coating film surface. Then, pressurized fluid is blown from the nozzles 18 to separate the end portion of the coating film 21 from the substrate 19. Subsequently, the coating film is removed from the substrate. The vacuum force of the substrate 19 to the substrate fixing stand 2 ceases, and the substrate fixing stand 2 is lowered. Afterwards, the conveying belts 73 are driven again to convey the substrate 19 in the direction of arrow A, i.e., to the left as seen in the drawing.

Further, if means for automatically removing the coating film 21 from the substrate is added to this embodiment, it will become possible to perform all the film separation processes continuously without any manual operation, thereby making it possible to efficiently produce substrates whose surfaces are in a uniform condition.

In the following, a coating film separating device according to an embodiment of the present invention equipped with a coating film removing means will be described with reference to FIGS. 10, 11, 12 and 13.

In the embodiment shown in FIGS. 10 to 13, the roller unit 7, the guide means 4, the substrate conveying means, and the raising/lowering means for the substrate fixing stand are the same as those in the above-described embodiments, so a description thereof will be omitted here. Provided on the base 1 are two support frames 101 which are spaced apart from each other along the dimension indicated by arrow A. Arranged on the support frames 101 so as to extend therebetween is a guide cylinder 102 composed of a guide section 102a and a slider section 102b. The guide cylinder 102 is so designed that by applying pressurized fluid to the slider section 102b within the guide section 102a, the slider section 102 slides along the guide section 102a. In this embodiment, the slider section 102b is directed upwards. Secured to the upper surface of the slider section 102b is a coating film gripping unit 103, which constitutes the coating film removing means.

The coating film gripping unit 103 will be described with reference to FIGS. 11 and 12. Secured to the upper surface of the slider section 102b is one end of a jaw support plate 106 which is substantially L-shaped in plan view. The other end of the jaw support plate 106 is positioned substantially in the middle of the width of the substrate 19, i.e., in the middle of the side of the substrate extending along a dimension crossing the direction of arrow A (see FIG. 11). Integrally provided on the lower surface of the other end portion of the jaw support plate 106 is a jaw cylinder 109 having a piston rod 110 extending in the direction of arrow D; and formed at a position spaced apart from the jaw cylinder 109 is a stationary jaw 107. Formed in the lower section of the stationary jaw 107 is an inclined clamp section 107a extending obliquely downwards, in a direction opposite to arrow D as seen in the side view of FIG. 12. The jaw cylinder 109 and the stationary jaw 107 are integrally connected through two jaw guides 111 which are parallel to each other. Slidably provided on the jaw guides 111 is a movable jaw 108 having a clamp section 108a opposed to the clamp section 107a of the stationary jaw 107 and having substantially the same configuration as the clamp section 107a. Formed on the surface of the stationary jaw 107 opposed to the movable jaw 108 is a spring hole which is parallel to the jaw guides 111 and into which is inserted a compression coil spring 112 for biasing the movable jaw 108 to the right as seen in the drawing.

When pressurized fluid is introduced into the interior of the jaw cylinder 109 from a pressurized fluid source (not shown) connected to the jaw cylinder 109, the movable jaw 108 is pressed by the piston rod 110 and moves in the direction indicated by arrow D (FIG. 12) against the resilience of the compression coil spring 112, thereby causing the clamp section 108a of the movable jaw 108 to abut the clamp section 107a of the stationary jaw 107. When the supply of pressurized fluid to the interior of the jaw cylinder 109 is stopped, the movable jaw 108 moves to the right (as seen in the drawing) by the resilience of the compression coil spring 112, thereby releasing the clamping action of the clamp sections 107a and 108a.

The coating film gripping unit 103 is moved parallel to the conveyance of the substrate 19. The gripping unit 103 is driven by the guide cylinder 102, and the range of its movement is between the position where it can grip the coating film 21 by the clamp sections 107a and 108a at the rear end of the substrate 19 and the position where it completely removes the coating film from the substrate 19 after having moved in the direction of arrow D.

Provided at either end of the guide section 102a are end stoppers 113 for the slider section 102b. These end stoppers may be equipped with built-in movement-end detection sensors 121 for detecting the slider section 102b when it is at an end of the guide section 102a.

A container 104 having a funnel-like opening in its upper section may be arranged such that it is below the clamp sections 107a and 108a when the coating film gripping unit 103 is at the foremost end of its range of movement (the left-hand end as seen in FIG. 10). A gas-permeable bucket 105 is detachably arranged inside the container 104 such that it is spaced away from the inner wall of the container by a gap. The container 104 communicates with a second suction device (not shown). The coating film 21 brought to a position above the container 104 by the coating film gripping unit 103 is sucked into the container 104 through its opening and lodged in the bucket 105.

Next, will be described a method of removing coating films using the above-described coating film separating device.

In this embodiment, the operations of conveying the substrate 19 with the coating film 21 from the storage bin 79, holding it by the substrate holding means, and separating an end portion of the coating film 21 from the substrate 19 are performed in the same manner as in the embodiments described above. When the roller detection sensor 17 detects that the roller unit 7 has reached the end of the movement thereof from the position shown in FIG. 13, the rotation of the motor 14 is stopped. Next, as shown in FIG. 12, the coating film gripping unit 103 is moved, with the stationary and movable jaws 107 and 108 separated from each other, to the rear end of its range of movement (indicated by the dashed line of FIG. 12).

When pressurized fluid is blown from the nozzles 18 against the gap between the coating film 21 and the substrate 19, a part of the coating film 21 is peeled off from the end portion of the substrate 19 by the force of the pressurized fluid, and brought into close contact with the clamp surface of the stationary jaw 107 (as indicated by the dashed line in FIG. 12). Then, pressurized fluid is supplied to the jaw cylinder 109 to cause the movable jaw 108 to abut the stationary jaw 107, thereby causing the coating film gripping unit 103 to grip the coating film 21 which is in close contact with the clamp surface 107a of the stationary jaw 107. Subsequently, the coating film gripping unit 103 holding the coating film 21 is made to advance perpendicularly to the width of the substrate 19 (as indicated by arrow D of FIG. 12), thereby allowing the coating film 21 to be removed from the surface of the substrate 19.

When the end detection sensor 121 or the like attached, for example, to the guide section 102a detects that the coating film gripping unit 103 has reached the far end of its range of movement, the supply of pressurized fluid to the jaw cylinder 109 is stopped, thereby releasing the gripping action of the coating film 21 by the stationary and movable jaws 107 and 108. At the same time, the second suction device connected to the container 104 is operated to cause the coating film 21 to be sucked into the container 104. When the coating film 21 has been sucked into the container 104, the vacuum force of the substrate 19 to the substrate fixing stand 2 ceases, and the substrate fixing stand 2 is lowered. Afterwards, the conveying belts 73 are made to run again, thereby conveying the substrate 19 in the direction indicated by arrow D.

By the series of operations described above, the coating film 21 can be removed from the surface of the substrate 19 without any manual operation, thus substantially contributing to labor saving and improvement in efficiency in the coating film removing process. Further, since the speed at which the coating film 21 is separated from the substrate 19 can be uniformly controlled, it is possible to control the surface condition of the substrate. For example, the amount of charge, remaining adhesive or the like thereon, can be kept uniform and to a minimum. Accordingly, the coating film separating device described above is especially applicable to the mass production of high-quality optical mediums.

Further, it is also possible for the coating film separating device of the present invention to be equipped with means for reversing the substrate 19. In the following, an embodiment of the coating film separating device of the present invention which is equipped with substrate reversing means will be described with reference to FIGS. 14 and 15. FIG. 14 is a plan view of the embodiment, and FIG. 15 is a sectional view taken along the line E-E' of FIG. 14.

In FIG. 14, provided by the side of the substrate fixing stand 2 is a guide cylinder 141 extending vertically downwards. The guide cylinder 141 has the same construction as the above-described coating film separating means 102. The slider section of the guide cylinder 141 is arranged to face the roller unit 7. A rotary actuator 143 is secured to the slider section of the guide cylinder 141 through the intermediation of a rotary-actuator mounting plate 142 which is substantially L-shaped in a plan view. Attached to the top end portion of the rotating shaft of the rotary actuator 143 is a parallel finger 144 having horizontal clamp sections 145. The parallel finger 144 is adapted to grip, from above and below by the clamp sections 145, substantially the middle section of the substrate 19 which is parallel to the conveyance thereof. The guide cylinder 141, the rotary actuator mounting plate 142, the rotary actuator 143 and the parallel finger 144 constitute the substrate reversing means.

Further, as shown in FIG. 15, formed in the central section of that side surface of the substrate fixing stand 2 which faces the parallel finger 144 is a cutout 2a for avoiding interference of the clamp sections 145 of the parallel finger 144 with the substrate fixing stand 2. Further, to ensure a sufficient gripping allowance for the parallel finger 144 when it grips the substrate 19, the conveying belt 73 facing the parallel finger 144 is stretched at a position away from the side plate. The other structural features of this embodiment are the same as those of the above-described ones, so a detailed description thereof will be omitted here.

Next, the operation of the coating film separating device of this embodiment will be described.

In this embodiment, the coating film 21 is separated from the surface of the substrate 19 and sucked into the container (not shown) in the same manner as in the above embodiments, therefore, a detailed description of these operations will be omitted here. In the following, the operations taking place after the sucking of the coating film 21 into the container 104 will be described.

When the coating film 21 separated from the surface of the substrate 19 has been sucked into the container 104, the vacuum suction of the substrate 19 to the substrate fixing stand 2 ceases. Then, the parallel finger 144 grips the central section of the substrate between clamp sections 145, and the guide cylinder 141 raises the substrate 19 by causing the parallel finger 144 to ascend (see the section indicated by the dashed line of FIG. 15). When the parallel finger 144 has reached the upper end of the guide cylinder 141, the rotary actuator 143 causes the parallel finger 144 to rotate 180°, thereby reversing the substrate 19. When the substrate 19 has been reversed, the guide cylinder 141 causes the parallel finger 144 to descend to place the the substrate 19 on the upper surface of the substrate fixing stand 2. Afterwards, the clamp sections 145 of the parallel finger 144 are set apart to release the gripping of the substrate 19, and the suction device (not shown) causes the substrate 19 to again be suction-attached to the substrate fixing stand 2.

By the above operations, the substrate 19 is secured in position on the surface of the substrate fixing stand 2, with its reverse side facing upwards. Then, the coating film 21 on the reverse side of the substrate 19 can be separated by the same procedures as in the separation of the coating film 21 from the obverse side of the substrate 19.

By providing the coating film separating device with a means for reversing the substrate, as in this embodiment, it is possible to continuously separate a coating film adhered to the obverse and reverse sides of a substrate without any manual operation.

As has been described, in accordance with the present invention, a roller is pressed against an end portion of a surface of a coating film covering a substrate and, in this condition, the roller is rotated and moved, thereby causing the coating film portion to become loose on the end portion of the substrate. The coating film portion which has thus become loose facilitates the separation of the coating film from the substrate.

Further, since no double-coated adhesive tape is used for the separation of coating films, a reduction in production costs can be attained, and, further, the film separating operation can be conducted in a stable manner.

Further, after the end portion of the coating film on the substrate has become loose as a result of the movement of the roller, fluid is blown against the interface between the end portion of the coating film and the corresponding end portion of the substrate, thereby raising the loose end portion of the coating film from the substrate. As a result, it becomes easy to grip the end portion of the coating film, thus enabling the coating film to be separated from the substrate more easily.

Further, in accordance with the present invention, the roller is rotated with its peripheral surface being pressed against the coating film portion on the end portion of the substrate, and the roller is moved by the torque due to this rotation, along the end portion of the substrate, thereby causing the end portion of the coating film on the end portion of the substrate to become loose. By blowing fluid against the corresponding end surface of the substrate, the loose coating film portion is raised so as to be easily gripped. Further, by gripping the raised portion of the coating film by the coating film removing means and moving this coating film removing means from one end of the substrate to the other, it is possible to completely remove the coating film from the substrate surface.

By removing the coating film through a series of operations of the roller, the fluid blowing means and the coating film removing means, it is possible to separate the coating film in a stable manner without using any double-coated adhesive film. Further, since the coating film can be removed without any manual operation, the coating film removing operation can be conducted efficiently without depending upon the operational conditions. Furthermore, since the speed at which the coating film is separated from the coating film can be controlled to be uniform, it is possible to efficiently obtain a substrate with a surface having little or no charge and/or adhesive after the separation of the coating film therefrom, i.e., a substrate which exhibits a uniform surface condition.

What is claimed is:

1. A coating film separating device comprising:
   substrate holding means for holding a substrate having first and second surfaces, with at least one surface being covered with a coating film;
   a roller unit equipped with a roller and means for pressing said roller against an edge portion of a surface of the coating film;
   roller unit driving means for moving said roller unit on the edge portion of the surface of the coating film in a widthwise direction of the substrate;
   guide means for guiding said roller unit to move along an edge portion of the substrate;
   spraying means for spraying pressurized fluid at an interface between the substrate and the coating film at the edge portion of the substrate along which said roller unit moves; and substrate reversing means for turning the substrate from a first surface-up position to a second surface-up position.

2. A coating film separating device according to claim 1, wherein said roller unit driving means includes means for rotatively driving said roller about its own axis.

3. A coating film separating device according to claim 1, wherein said roller unit driving means includes a rack formed on said guide means and a motor with a driving shaft engaging with said rack.

4. A coating film separating device according to claim 1, further comprising means for conveying the substrate in a longitudinal direction and means for raising and lowering said substrate holding means.

5. A coating film separating device according to claim 1, wherein said substrate holding means includes vacuum means for applying a vacuum force to the substrate, and a substrate fixing stand having a surface against which the substrate is adhered to by the vacuum force.

6. A coating film separating device according to claim 1, wherein a peripheral surface of said roller has teeth extending in a parallel direction to a longitudinal axis of said roller.

7. A coating film separating device according to claim 6, wherein said teeth provided on the peripheral surface of said roller have a depth ranging from 0.3 to 3 mm.

8. A coating film separating device according to claim 6, wherein said teeth provided on the peripheral surface of said roller have a pitch ranging from 0.2 to 2 mm.

9. A coating film separating device according to claim 1, wherein said roller has a diameter ranging from 10 to 30 mm.

10. A coating film separating device according to claim 1, wherein said roller is pressed against the surface of the coating film with a force ranging from 0.15 to 0.5 kgf/mm.

11. A coating film separating device according to claim 10, wherein said roller is pressed against the surface of the coating film with a force ranging from 0.25 to 0.3 kgf/mm.

12. A coating film separating device according to claim 1, wherein said roller and the substrate overlap each other by a distance ranging from 5 to 15 mm.

13. A coating film separating device according to claim 1, wherein said roller is arranged such that its rotational axis is at an angle of 10° to 40° with respect to an axis extending in a longitudinal direction of the substrate.

14. A coating film separating device according to claim 1, wherein said roller is formed of carbon steel.

15. A coating film separating device comprising:

substrate holding means for holding a substrate having first and second surfaces, with at least one surface being covered with a coating film;

a roller unit equipped with a roller and means for pressing said roller against an edge portion of a surface of the coating film;

roller unit driving means for moving said roller unit on the edge portion of the surface of the coating film in a widthwise direction of the substrate;

guide means for guiding said roller unit to move along an edge portion of the substrate;

spraying means for spraying pressurized fluid at an interface between the substrate and the coating film at the edge portion of said substrate along which said roller unit moves;

coating film removing means for removing the coating film from the substrate, said removing means including coating film gripping means for gripping an end portion of the coating film separated from the substrate and means for moving said coating film gripping means in a direction perpendicular to the widthwise direction of the substrate; and substrate reversing means for turning the substrate from a first surface-up position to a second surface-up position.

16. A coating film separating device according to claim 15, further comprising means for conveying the substrate in a longitudinal direction and means for raising and lowering said substrate holding means.

17. A coating film separating device according to claim 15, wherein said roller unit driving means includes means for rotatively driving said roller about is own axis.

18. A coating film separating device according to claim 15, wherein said roller unit driving means includes a rack formed on said guide means and a motor with a driving shaft engaging with said rack.

19. A coating film separating device according to claim 15, wherein the coating film gripping means includes a coating film gripping unit equipped with a stationary jaw and a movable jaw.

20. A coating film separating device according to claim 15, wherein said substrate holding means includes vacuum means for applying a vacuum force to the substrate, and a substrate fixing stand having a surface to which the surface is adhered by the vacuum force.

21. A coating film separating device according to claim 15, wherein a peripheral surface of said roller has teeth extending in a parallel direction to a longitudinal axis of said roller.

22. A coating film separating device according to claim 21, wherein said teeth provided on the peripheral surface of said roller have a depth ranging from 0.3 to 3 mm.

23. A coating film separating device according to claim 21, wherein said teeth provided on the peripheral surface of said roller have a pitch ranging from 0.2 to 2 mm.

24. A coating film separating device according to claim 15, wherein said roller has a diameter ranging from 10 to 30 mm.

25. A coating film separating device according to claim 15, wherein said roller is pressed against the surface of the coating film with a force ranging from 0.15 to 0.5 kgf/mm.

26. A coating film separating device according to claim 15, wherein said roller is pressed against the surface of the coating film with a force ranging from 0.25 to 0.3 kgf/mm.

27. A coating film separating device according to claim 15, wherein said roller and the substrate overlap each other by a distance ranging from 5 to 15 mm.

28. A coating film separating device according to claim 15, wherein said roller is arranged such that its rotational axis is at an angle of 10° to 40° with respect to an axis extending in a longitudinal direction of the substrate.

29. A coating film separating device according to claim 15, wherein said roller is formed of carbon steel.

* * * * *

UNITED STATES PATENT AND TRADEMARK OFFICE
CERTIFICATE OF CORRECTION

PATENT NO. : 5,344,521         Page 1 of 2
DATED      : September 6, 1994
INVENTOR(S): Ohsaki It is certified that error appears in the above-indentified patent and that said Letters Patent is hereby corrected as shown below:

COLUMN 2:

Line 22, "meas" should read --means--.
Line 64, "FOGS. 6(a)" should read --FIGS. 6(a)--.

COLUMN 6:

Line 68, "driving 72a" should read --driving shaft 72a--.

COLUMN 7:

Line 40, "stand 20" should read --stand 2--.

COLUMN 8:

Line 53, "section 102" should read --section 102b--.

COLUMN 12:

Line 47, "coating film" should read --substrate--.

UNITED STATES PATENT AND TRADEMARK OFFICE
CERTIFICATE OF CORRECTION

PATENT NO. : 5,344,521
DATED : September 6, 1994
INVENTOR(S) : Ohsaki

It is certified that error appears in the above-indentified patent and that said Letters Patent is hereby corrected as shown below:

<u>COLUMN 14</u>:

Line 20, "is" should read --its--.
Line 34, "surface" should read --substrate--.

Signed and Sealed this

Fourth Day of April, 1995

*Attest:*

BRUCE LEHMAN

*Attesting Officer*     *Commissioner of Patents and Trademarks*